US011302989B2

(12) United States Patent
Sueyoshi et al.

(10) Patent No.: US 11,302,989 B2
(45) Date of Patent: Apr. 12, 2022

(54) BATTERY PACK

(71) Applicant: HONDA MOTOR CO., LTD., Tokyo (JP)

(72) Inventors: Shunichiro Sueyoshi, Wako (JP); Keisuke Muraoka, Wako (JP); Shuji Nagatani, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 300 days.

(21) Appl. No.: 16/465,342

(22) PCT Filed: Nov. 17, 2017

(86) PCT No.: PCT/JP2017/041497
§ 371 (c)(1),
(2) Date: May 30, 2019

(87) PCT Pub. No.: WO2018/116715
PCT Pub. Date: Jun. 28, 2018

(65) Prior Publication Data
US 2019/0296303 A1    Sep. 26, 2019

(30) Foreign Application Priority Data
Dec. 23, 2016  (JP) ................ JP2016-250244

(51) Int. Cl.
*H01M 2/10*     (2006.01)
*H01M 10/6561*  (2014.01)
(Continued)

(52) U.S. Cl.
CPC .......... *H01M 50/24* (2021.01); *B25F 5/00* (2013.01); *B25F 5/02* (2013.01); *H01M 10/613* (2015.04);
(Continued)

(58) Field of Classification Search
CPC ......... H01M 10/613; H01M 10/6235; H01M 10/60; H01M 10/625; H01M 10/6561; H01M 50/20; H01M 50/24
See application file for complete search history.

(56) References Cited

U.S. PATENT DOCUMENTS 5,620,057 A      4/1997  Klemen et al.
2003/0037524 A1* 2/2003  Iida ................ A01D 34/6812
                                              56/11.9
(Continued)

FOREIGN PATENT DOCUMENTS

JP    2005209369 A    8/2005
JP    2013000026 A    1/2013
(Continued)

OTHER PUBLICATIONS

Extended European Search Report for EP Application No. 17882978.4, dated Sep. 30, 2019, 6 pages.
(Continued)

*Primary Examiner* — Sarah A. Slifka
*Assistant Examiner* — Rachel L Zhang
(74) *Attorney, Agent, or Firm* — Armstrong Teasdale LLP

(57) ABSTRACT

A battery pack having an air communication passage communicating the interior of the battery pack accommodating battery cells with the exterior of the battery pack, and configured to prevent moisture from reaching the battery cells. The battery pack includes a housing having outer and inner bottom plates, and defining a primary chamber for accommodating battery cells and a secondary chamber between the outer and inner bottom plates. The housing includes an air communication passage communicating the secondary chamber with an exterior of the housing. A part of a bottom surface of the inner bottom plate adjacent to an upright wall inclines upward with respect to a reference surface of the bottom surface of the inner bottom plate away from the outer bottom plate toward the upright wall. The air communication passage includes a first communication hole having an edge located above the reference surface of the inner bottom plate.

10 Claims, 7 Drawing Sheets

Figure 1:
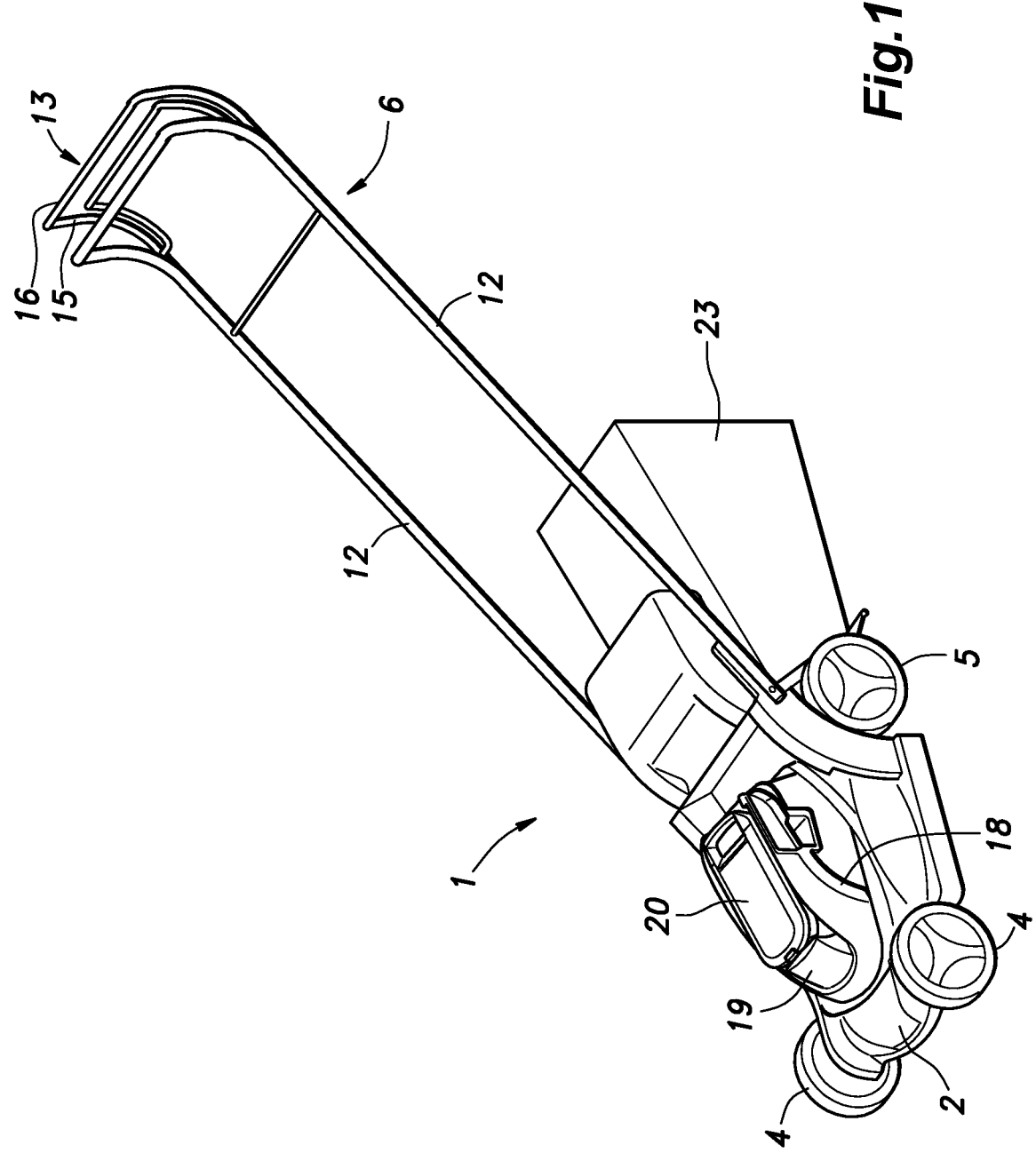

(51) Int. Cl.
    *H01M 10/613*     (2014.01)
    *H01M 10/625*     (2014.01)
    *B25F 5/00*     (2006.01)
    *H01M 50/24*     (2021.01)
    *H01M 10/6556*     (2014.01)
    *H01M 10/6554*     (2014.01)
    *B25F 5/02*     (2006.01)
    *H01M 10/6563*     (2014.01)
    *H01M 10/6566*     (2014.01)
    *H01M 10/6235*     (2014.01)
    *H01M 10/6565*     (2014.01)
    *H01M 50/20*     (2021.01)
    *A01D 34/68*     (2006.01)
    *A01D 34/69*     (2006.01)
    *A01D 34/78*     (2006.01)
    *A01D 101/00*     (2006.01)

(52) U.S. Cl.
    CPC ..... *H01M 10/625* (2015.04); *H01M 10/6235* (2015.04); *H01M 10/6554* (2015.04); *H01M 10/6556* (2015.04); *H01M 10/6561* (2015.04); *H01M 10/6563* (2015.04); *H01M 10/6565* (2015.04); *H01M 10/6566* (2015.04); *H01M 50/20* (2021.01); *A01D 34/6806* (2013.01); *A01D 34/69* (2013.01); *A01D 34/78* (2013.01); *A01D 2101/00* (2013.01); *H01M 2220/20* (2013.01)

(56) References Cited

U.S. PATENT DOCUMENTS

| | | |
|---|---|---|
| 2013/0057074 A1 | 3/2013 | Takano |
| 2013/0244078 A1* | 9/2013 | Kwak ............... H01M 10/6566 429/120 |
| 2016/0068224 A1 | 3/2016 | Rasmussen |
| 2016/0285139 A1 | 9/2016 | Kimura |
| 2018/0241017 A1 | 8/2018 | Nakamura et al. |

FOREIGN PATENT DOCUMENTS

| | | |
|---|---|---|
| JP | 2013055748 A | 3/2013 |
| KR | 20140077272 A | 6/2014 |
| WO | 2017073201 A1 | 5/2017 |

OTHER PUBLICATIONS

English translation of International Search Report for International Application No. PCT/JP2017/041497, dated Dec. 19, 2017, 2 pages.

* cited by examiner

BATTERY PACK

CROSS-REFERENCE TO RELATED APPLICATIONS

This application is a U.S. National Phase Application of PCT/JP2017/041497, filed Nov. 17, 2017, which claims the benefit of priority to JP Application No. 2016-250244, filed Dec. 23, 2016, the contents of which are hereby expressly incorporated by reference in their entirety.

TECHNICAL FIELD

The present invention relates to a removable, rechargeable battery pack for supplying electric power to an electric lawn mower.

BACKGROUND ART

Electric power equipment such an electric lawn mower for mowing lawn is known to be equipped with a removable battery pack for the purpose of improving the work efficiency for the user. See Patent Document 1, for instance. Since such electric power equipment is primarily used outdoors, the battery pack and the associated electric component parts are required to be protected from moisture originating from rainwater and watering devices.

The electric lawn mower disclosed in Patent Document 1 is provided with a battery cover configured to selectively close a battery mounting part so that the battery mounting part is protected from moisture. Furthermore, a drain hole is provided in a lowest part of the battery mounting part so that moisture such as rainwater that may have come into the battery cover can be drained from the drain hole, and the waterproofing of the battery mounting part can be ensured.

PRIOR ART DOCUMENT(S)

Patent Document(s)

Patent Document 1: JP2013-000026A

SUMMARY OF THE INVENTION

Task to be Accomplished by the Invention

In recent years, there is growing a trend to increase the capacity of the battery pack mounted on the electric lawn mower in order to improve work efficiency, and this in turn has created the need to deal with the problem of heat generated from the battery cells. To overcome the problem of the heat generated from the battery pack, an air communication passage may be provided in the battery pack communicating the interior of the battery pack accommodating the battery cells therein with the exterior of the battery pack. However, according to the electric lawn mower disclosed in Patent Document 1, once rainwater or the like has reached the battery mounting part, the rainwater may infiltrate into the battery pack via the air communication passage. Therefore, there is a need for a battery pack having an air communication passage communicating the interior of the battery pack accommodating battery cells therein with the exterior of the battery pack, and configured to prevent moisture from reaching the battery cells.

In view of such a problem of the prior art, a primary object of the present invention is to provide a battery pack having an air communication passage communicating the interior of the battery pack accommodating battery cells therein with the exterior of the battery pack, and configured to prevent moisture from reaching the battery cells.

Means for Accomplishing the Task

To achieve such an object, the present invention provides a battery pack (2), comprising: a housing (100) having an outer bottom plate (145) and an inner bottom plate (141), and defining a primary chamber (97) for accommodating battery cells (98) above the inner bottom plate, and a secondary chamber (148) between the outer bottom plate and the inner bottom plate; wherein the outer bottom plate includes an outer flat plate (146) extending substantially in parallel to the inner bottom plate and an upright wall (147) extending from a peripheral part of the outer flat plate to abut against a peripheral part of the inner bottom plate, the inner bottom plate being provided with at least one opening surrounded by a tubular flange (143) projecting toward the outer bottom plate, the housing including an air communication passage communicating the secondary chamber with an exterior of the housing; and wherein a part of a bottom surface of the inner bottom plate adjacent to the upright wall inclines upward with respect to a reference surface of the bottom surface of the inner bottom plate away from the outer bottom plate toward the upright wall, the air communication passage including a first communication hole (149) having an edge located above the reference surface of the inner bottom plate.

Thereby, an airflow passage is formed in the battery pack. Furthermore, even if the battery pack is positioned such that the bottom surface of the battery pack faces vertically upward, and water should intrude into the secondary chamber, the water is allowed to flow from a part of the inner bottom plate adjoining the upright wall to a peripheral part of the inner bottom plate along the bottom surface of the inner bottom plate to be eventually drained from the first communication hole. Therefore, the water is prevented from reaching the battery cells.

Preferably, the upright wall inclines outward from the peripheral part of the outer flat plate toward the peripheral part of the inner bottom plate.

Thereby, owing to the outward inclination of the upright wall, water is prevented from being trapped in a boundary between the upright wall and the outer flat plate.

Preferably, the air communication passage includes a second air communication hole (150A, 150B) formed in the upright wall.

Since the water in the secondary chamber is drained via the second communication hole, the water is further prevented from reaching the battery cells.

Preferably, the second air communication hole is passed through substantially orthogonally to the reference surface.

Thereby, when the battery pack is positioned so that the bottom surface thereof faces vertically downward, the second communication hole extends vertically downward so that the water can be readily drained from the battery pack. Furthermore, since the upright wall is inclined with respect to the vertical direction, intrusion of water into the secondary chamber along the side surface of the battery pack can be minimized.

Preferably, a part of the bottom surface of the inner bottom plate extending outward at least from a position opposing the second communication hole inclines upward.

When the battery pack is positioned so that the bottom surface thereof faces vertically downward, the water that has intruded into the secondary chamber via the second communication hole may reach the bottom surface of the inner bottom plate opposing the second communication hole, but the water that has reached to the part of the bottom surface of the inner bottom plate opposing the second communication hole can be drained to the exterior. Therefore, the water that has intruded into the secondary chamber can be favorably expelled from the first communication hole.

Preferably, a part of the inner bottom plate extending outward of the tubular flange inclines away from the outer bottom plate and the upright wall, and an angle formed between the reference surface and a part of the bottom surface of the inner bottom plate extending outward from the position opposing the second communication hole is greater than an angle formed between the reference surface and a part of the bottom surface of the inner bottom plate extending from the tubular flange to the position opposing the second communication hole.

Thereby, even when the battery pack is tilted from the position where the reference surface is horizontal, the water deposited on the part of the inner bottom plate opposing the second communication hole is prevented from moving inward or toward the tubular flange so that the water is prevented from reaching the battery cells.

Preferably, the outer flat plate is provided with a rib (152) extending in a part of the outer flat plate located between a part of the outer flat plate opposing the tubular flange and the vertical wall, and projecting toward the inner bottom plate.

Thereby, the air flow passage extending from the first and second communication holes to the opening surrounded by the tubular flange is formed as a labyrinth passage owing to the presence of the rib for obstructing water flow so that the water is prevented from reaching the battery cells.

Preferably, the outer flat plate is provided with a rib extending between a part of the outer flat plate opposing the tubular flange and the vertical wall and projecting toward the inner bottom plate, and a second communication hole (150C, 150D) formed in a part thereof located between the vertical wall and the rib.

Thereby, the air passage extending from the second communication hole to the opening surrounded by the tubular flange is formed as a labyrinth passage so that the water is prevented from reaching the battery cells.

Preferably, the battery pack is configured to be mounted on a main body (2) of an electric power equipment (1) with at least an upper part of the battery pack exposed to an exterior.

Thereby, the installing and removing of the battery pack is facilitated.

Preferably, the battery pack is configured to be mounted on the main body of the electric power equipment with the reference surface extending substantially horizontally, and an upper edge of the first communication hole is formed with a depending portion (149B) projecting downward along a side surface of the housing.

Thereby, when the battery is mounted on the main body, the water that drips along the side surface of the housing flows downward along the depending portion so that the water is prevented from reaching the battery cells.

Effect of the Invention

Thus, the present invention provides a battery pack having an air communication passage communicating the interior of the battery pack accommodating battery cells therein with the exterior of the battery pack, and configured to prevent moisture from reaching the battery cells.

BRIEF DESCRIPTION OF THE DRAWING(S)

Figure 2:
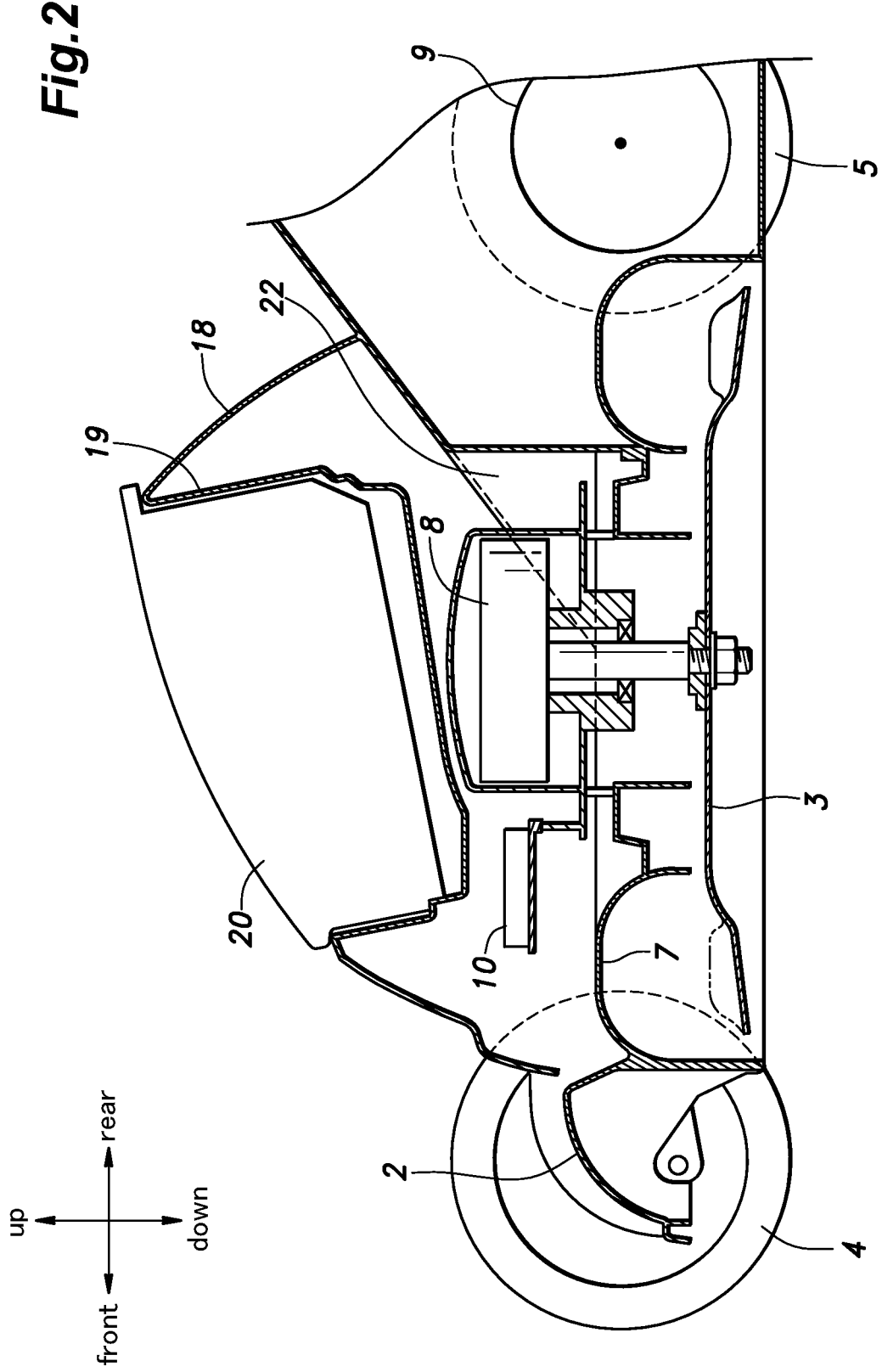
Figure 3:
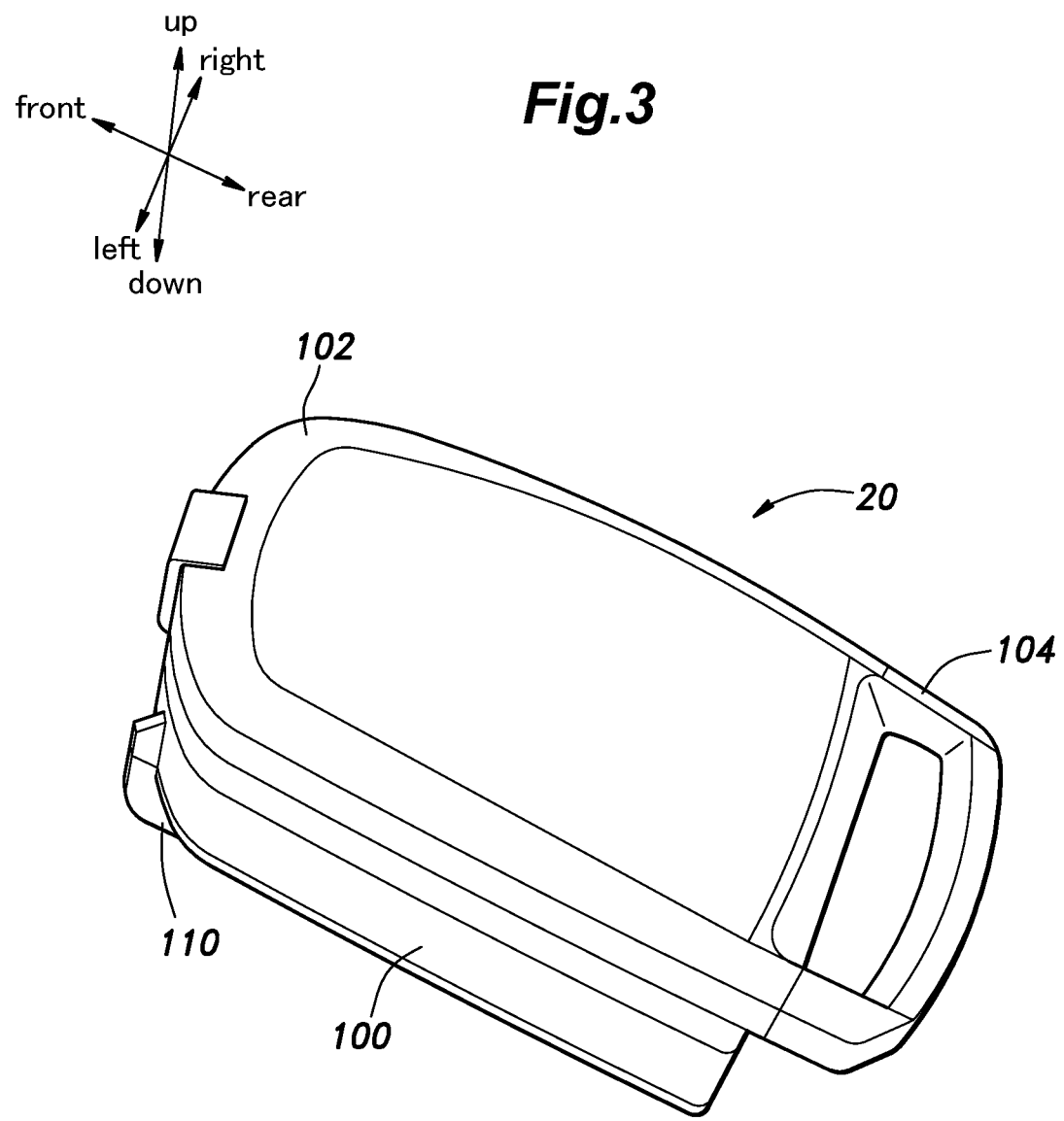
Figure 4:
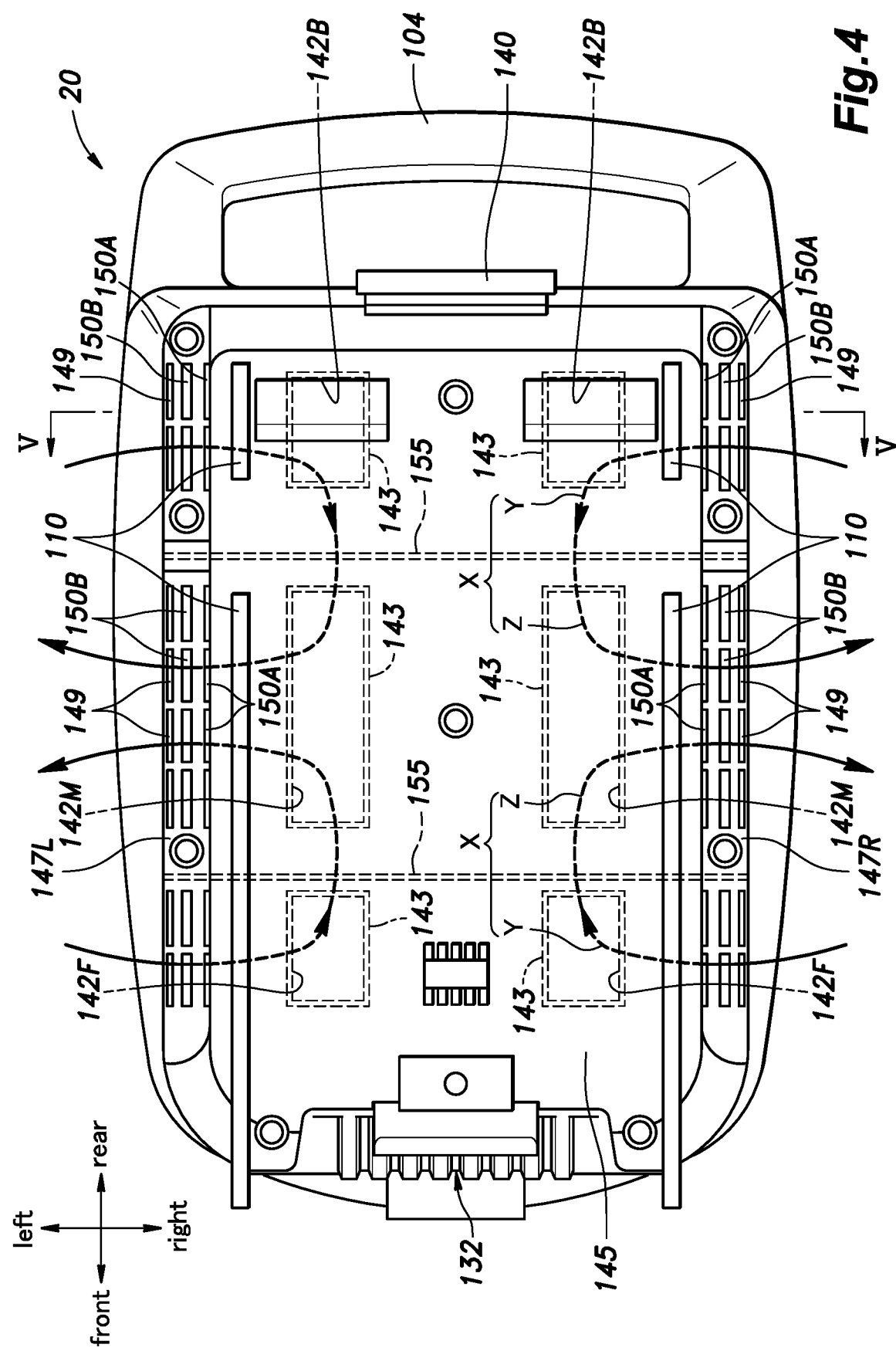
Figure 5:
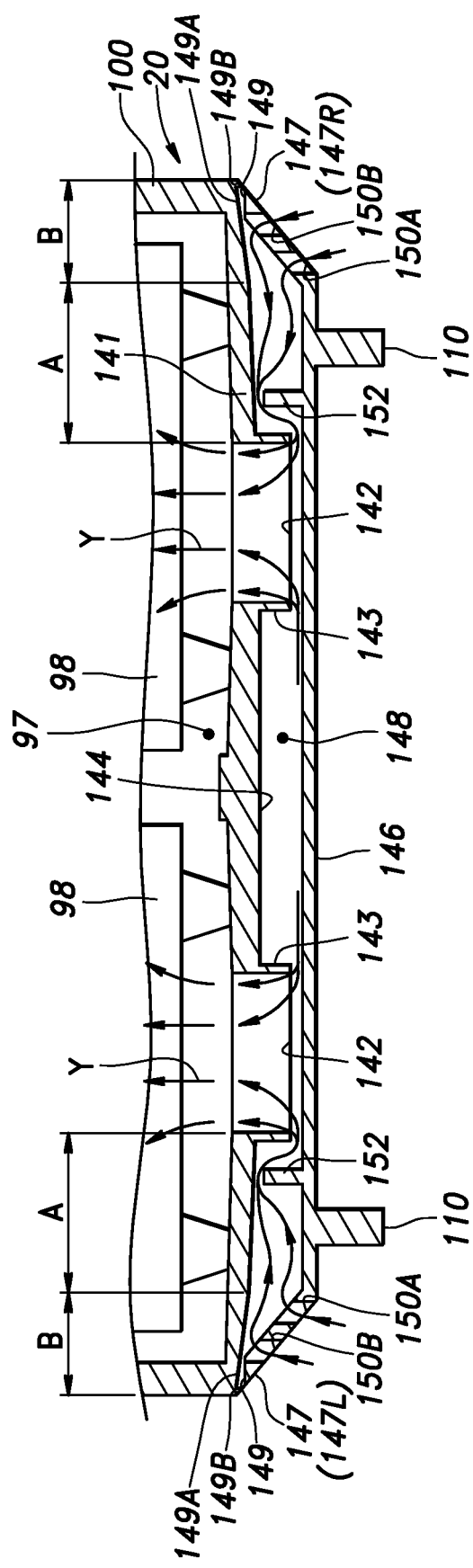
Figure 6A:
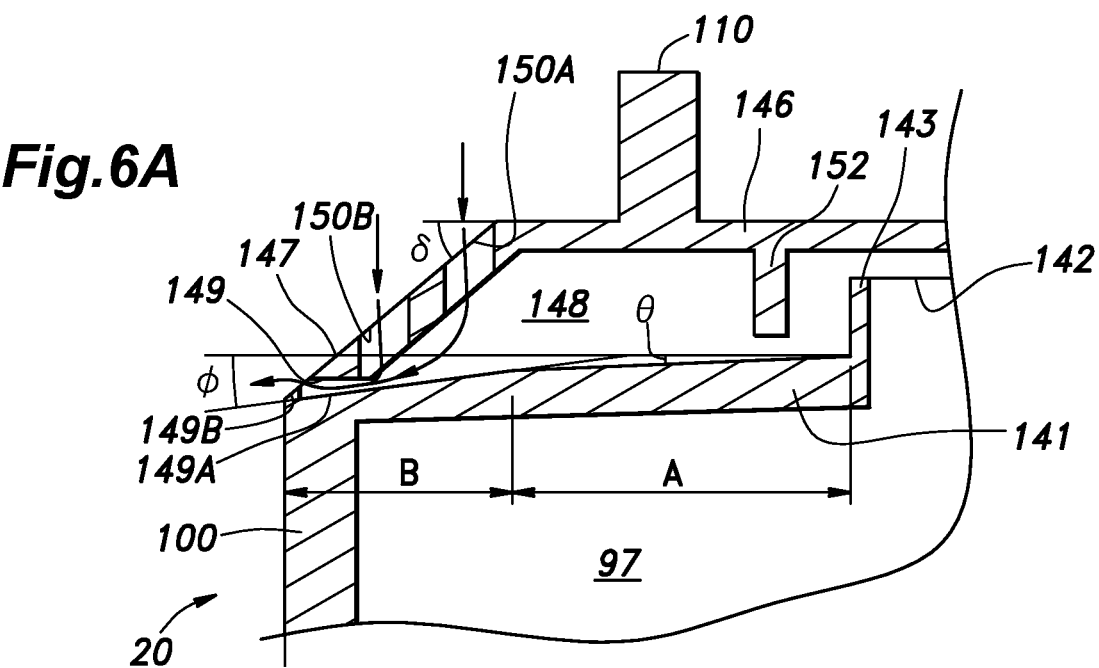
Figure 6B:
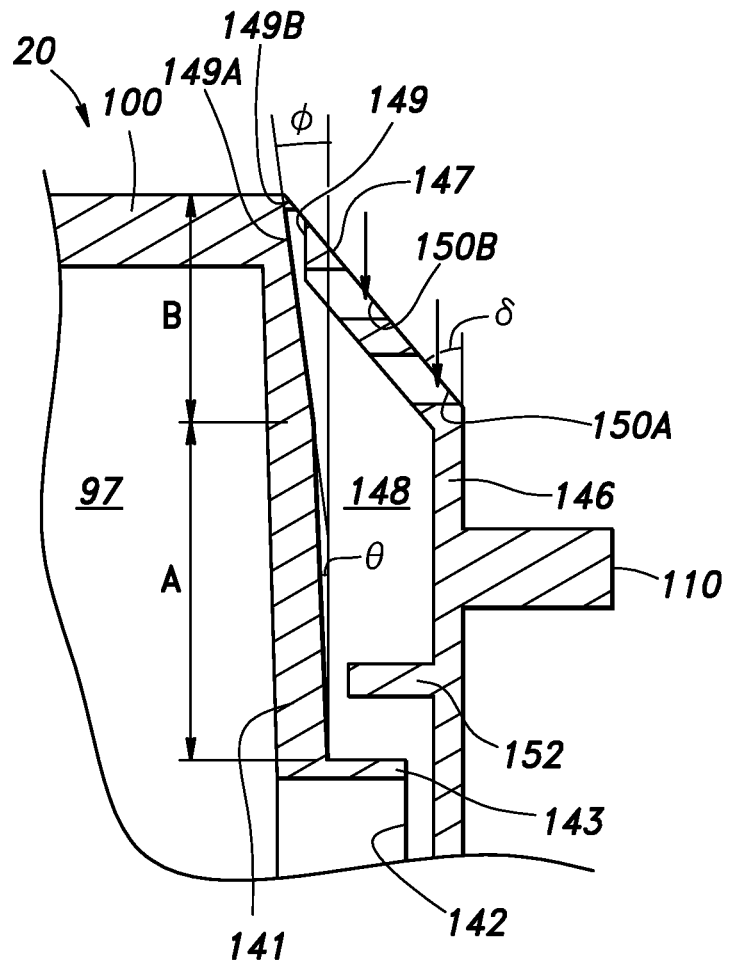
Figure 7:
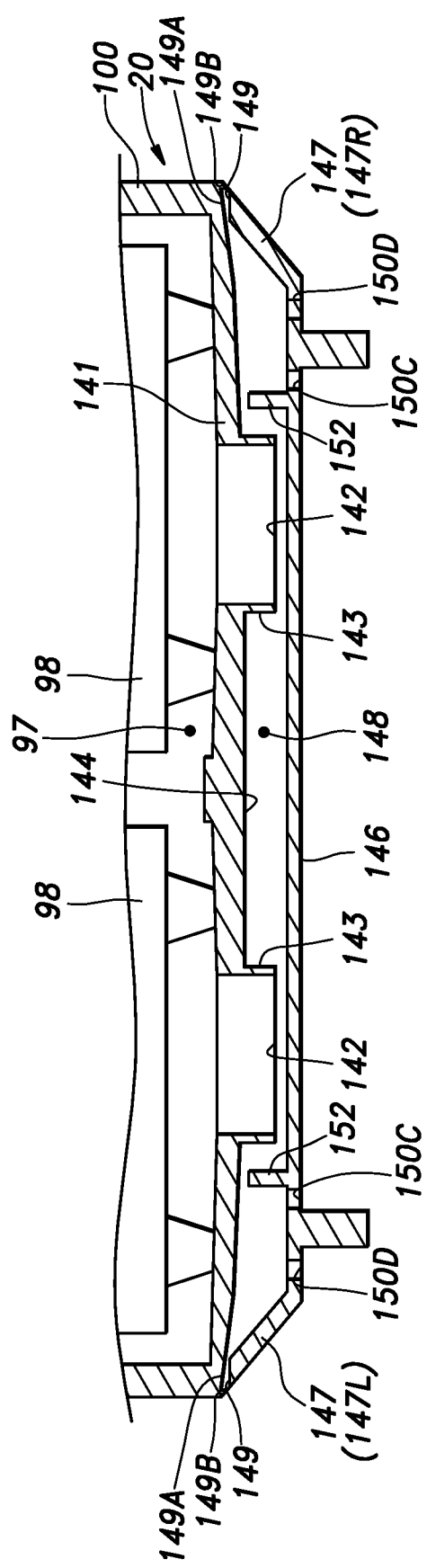

FIG. 1 is a perspective view of an electric lawn mower according to the present invention;
FIG. 2 is a sectional view of the electric lawn mower of FIG. 1;
FIG. 3 is a perspective view of a battery pack of the electric lawn mower of FIG. 1;
FIG. 4 is a bottom view of the battery pack of FIG. 2;
FIG. 5 is a sectional view taken along line V-V of FIG. 4;
FIG. 6A is a sectional view taken along line V-V with a bottom surface of the battery pack facing vertically upward;
FIG. 6B is a sectional view taken along line V-V with a side surface of the battery pack facing vertically upward; and
FIG. 7 is a sectional view of a battery pack according to a modified embodiment of the present invention.

MODES FOR CARRYING OUT THE INVENTION

Battery packs according to preferred embodiments of the present invention as mounted on an electric lawn mower given as an example of the electric power equipment are described in the following with reference to FIGS. 1 to 7.

As shown in FIGS. 1 and 2, the electric lawn mower 1 according to this embodiment includes a main body 2, a blade 3 provided in a lower part of the main body 2, and a pair of front wheels 4 and a pair of rear wheels coupled to the main body 2, and a handle 6 extending rearward and upward from the main body 2. A cavity 7 is provided centrally in lower part of the main body 2, and a blade 3 is received in the cavity 7. The main body 2 supports a blade motor 8 having a rotating shaft fitted with the blade 3, and a travel motor 9 for driving the left and right rear wheels 5. The blade motor 8 and the travel motor 9 each consist of an electric motor, and the main body 2 is provided with a control unit 10 for driving and controlling the electric motors.

The handle 6 includes a pair of side portions 12 extending upward and rearward from the respective lateral sides of the main body 2 and a rear cross portion 13 connecting the rear ends of the side portions 12 to each other. The rear cross portion 13 of the handle 6 is provided with a travel lever 15 for operating the travel motor 9 and a blade lever 16 for operating the blade motor 8.

In the upper part of the main body 2 are provided an upper cover 18 covering the blade motor 8, the travel motor 9, and the control unit 10. A battery pack 20 for supplying electric power to the motors 8 and 9 and the control unit 10 is removably received in a battery receiving recess 19 provided on the upper surface of the upper cover 18.

A passage 22 extending from the cavity 7 to the rear face of the main body 2 is formed in the main body 2, and a grass bag 23 is provided so as to close the open end. The grass cut by the blade 3 is discharged rearward from the cavity 7 through the passage 22 to be collected in the grass bag 23.

The battery pack 20 is arranged to extend in the fore and aft direction when the battery pack 20 is received in the battery receiving recess 19 as shown in FIG. 1. In the following direction, the front, rear, left, right, upper and lower directions are based on the orientation of the battery pack 20 as received in the battery receiving recess 19.

As shown in FIG. 3, the battery pack 20 includes a substantially rectangular parallelepiped housing 100 receiving battery cells 98 (FIG. 5) therein, and a battery cover 102 that is attached to the upper side of housing 100 to cover the upper opening of the interior of the housing 100. The battery pack 20 is mounted on the main body 2 so as to have a pair of surfaces facing generally in the vertical direction, a pair of surfaces generally facing in the lateral direction, and a pair of surfaces generally facing in the fore and aft direction with respect to the traveling direction of the electric lawn mower 1. In the present embodiment, as shown in FIG. 8, the battery cover 102 is secured to the front and rear walls of the housing 100 at the front edge and the rear edge thereof, respectively. As shown in FIG. 7, the rear end of the battery cover 102 is provided with a grip portion 104 connected to a part of the housing 100 adjoining the upper surface thereof and extending rearward in a substantially U-shape.

As shown in FIG. 4, bottom ribs 110 are provided on the lower surface of the battery pack 20 for positioning the battery pack 20 when installing the battery pack 20 in the battery receiving recess 19. Furthermore, a power feed connector 132 is provided at the front end of the battery pack 20, and an engagement portion 140 is provided at the rear end of the battery pack 20 to be engaged by a latch member (not shown in the drawings) provided at the rear wall of the battery receiving recess 19 when the battery pack 20 is received in the battery receiving recess 19.

As shown in FIG. 5, the bottom of the housing 100 on the lower side thereof is provided with a substantially horizontal inner bottom plate 141. The inner bottom plate 141 has a substantially rectangular shape defining straight edges along the front, rear, left and right sides, and is connected to the front, rear, left and right side walls at the front, rear, left and right edges, respectively, so as to form the housing 100. The front, rear, left, and right side walls of the housing 100, and the inner bottom plate 141 jointly define a recess that opens upward, and this opening is covered by the battery cover 102 (FIG. 3). The front, rear, left, and right side walls of the housing 100, the inner bottom plate 141, and the battery cover 102 jointly define a primary chamber 97. Battery cells 98 are placed in the primary chamber 97. In the present embodiment, two battery cells 98 are disposed laterally side by side in the single battery pack 20.

As shown by the broken lines in FIG. 4, three pairs of openings 142 (142F, 142M, 142B) are formed in the inner bottom plate 141. These openings are arranged in a fore and aft row along either side so as to be located under the battery cells 98. As shown in FIG. 5, each opening 142 is surrounded by a tubular flange 143 projecting downward. The tubular flanges 143 are thus arranged in laterally positioned pairs under the respective battery cells 98. Each opening 142 is provided with a rectangular shape which is elongated in the fore and aft direction.

The bottom surface of the inner bottom plate 141 includes a region which extends substantially horizontally between the tubular flanges 143 which are arranged laterally positioned pairs. As shown in FIG. 5, the bottom surface of the part of the inner bottom plate 141 located between each pair of tubular flanges 143 is horizontal at the cross sections taken at various fore and aft positions. In the following disclosure, the substantially horizontal bottom surface of the inner bottom plate 141 located between the pairs of tubular flanges 143 is referred to as reference surface 144.

The part of the bottom surface of the inner bottom plate 141 extending outward of the tubular flanges 143 is inclined upward with respect to the reference surface 144. The inclination angle of the bottom surface of the inner bottom plate 141 on the outer side of the tubular flanges 143 changes in two steps in such a manner that the inclination angle is larger on the side closer to the left and right edges of the inner bottom plate 141. More specifically, in the present embodiment, the inclination angle of the bottom surface of the inner bottom plate 141 changes in two steps with respect to the reference surface 144 in such a manner that the inclination angle θ (FIG. 5) of an area (area A) located at a certain distance from the laterally outer edge of the tubular flange 143 relative to the reference surface 144 is an angle smaller than 90 degrees, and the inclination angle φ of the area (area B) located from the outer edge of the area A to the lateral edge of the inner bottom plate 141 relative to the reference surface 144 is an angle larger than the inclination angle θ and smaller than 45 degrees.

The inner bottom plate 141 is made of a material having a favorable water repelling property, and the projecting height of the tubular flanges 143 from the reference surface 144 is selected to be higher than the height of water droplets that would be deposited on the reference surface 144.

As shown in FIGS. 5 and 6, an outer bottom plate 145 is provided under the inner bottom plate 141. The outer bottom plate 145 is substantially horizontal, and has an outer flat plate 146 substantially parallel to the reference surface 144. The outer flat plate 146 is formed in a substantially rectangular shape, and bottom ribs 110 or the like is attached to the bottom surface thereof. The left, right, front and rear edges of the outer flat plate 146 are located more inward of the battery pack 20 than the left, right, front and rear edges of the inner bottom plate 141. The projecting height of the tubular flanges 143 is selected so as not to abut onto the outer bottom plate 145.

The outer bottom plate 145 is provided with an upright wall 147 extending outward and upward from the left, right, front and rear edges of the outer flat plate 146 and abutting against the end part of the inner bottom plate 141. The upright wall 147 and the reference surface 144 form an angle δ which is greater than the angle φ. As shown in FIG. 4, the upright wall 147 includes a left upright wall 147L extending from the left edge of the outer flat plate 146 to the left edge of the inner bottom plate 141, and a right side upright wall 147R extending from the right edge of the outer flat plate 146 to the right edge of the inner bottom plate 141. As shown in FIG. 5, the secondary chamber 148 of the battery pack 20 is defined by the bottom surface of the inner bottom plate 141 and the top surface of the outer bottom plate 145.

The lateral width of the left upright wall 147L and the right upright wall 147R is selected so that the left edge of the left upright wall 147L and the right edge of the right upright wall 147R align vertically with the left and right edges of the area B, respectively.

A first communication hole 149 is provided in each of a plurality of parts of the left upright wall 147L which abuts against the inner bottom plate 141, and each of a plurality of parts of the right upright wall 147R which abuts against the inner bottom plate 141. The first communication holes 149 are arranged in the longitudinal (fore and aft) direction along either upright wall 147L, 147R. The upper edges 149A of the first communication holes 149 are located above the reference surface 144 of the inner bottom plate 141 over the entire lengths of thereof. In the present embodiment, the bottom surfaces of the lower edges of the first communication holes 149 are generally horizontal, and the top surfaces of the upper edges 149A are continuous with the bottom surface of the inner bottom plate 141 and at an angle relative to the reference surface 144. Further, above the opening edges of the first communication holes 149, a depending portion 149B projects downward from the peripheral edge.

As shown in FIG. 4, the left upright wall 147L and the right upright wall 147R are each provided with two rows of second communication holes 150A and 150B passed vertically therethrough orthogonally to the reference surface 144. The two rows of second communication holes 150A and 150B are arranged side by side on the left upright wall 147L and the right upright wall 147R.

Thus, the second communication holes 150A and 150B are formed in two rows immediately under the area B of the inner bottom plate 141, and the two rows of second communication holes 150A and 150B both face the area A of the inner bottom plate 141.

As shown in FIG. 5, inner ribs 152 project from a part of the upper surface of the outer flat plate 146 located laterally between the tubular flanges 143 and the second communication holes 150A and 150B toward the inner bottom plate 141. In the present embodiment, the inner ribs 152 project upward toward the part of the bottom surface of the inner bottom plate 141 corresponding to the area A, and the projecting ends thereof are positioned above the openings 142.

As shown in FIG. 4, the outer bottom plate 145 is attached to the inner bottom plate 141 by screws passed through a plurality of screw holes provided in the outer bottom plate 145.

The three pairs of openings 142 provided in the inner bottom plate 141 are separated from one pair to another by a pair of laterally extending partition ribs 155 so as to form a front pair, a middle pair and a rear pair. The openings 142 of the front pair are referred to as front openings 142F, the openings 142 of the middle pair are referred to as middle openings 142M, and the openings 142 of the rear pair are referred to as rear openings 142B.

The mode of operation of the battery pack 20 is described in the following. As shown in FIG. 1, the battery pack 20 is mounted on the top of the main body 2 of the electric lawn mower 1 with at least the top of the battery pack 20 is exposed. The battery pack 20 supplies electric power to the main body 2 to power the motors 8 and 9 of the main body 2 so that grass may be mowed.

The battery pack 20 is internally provided with an air flow passage X extending from the exterior of the battery pack 20 to the battery cells 98 to allow a forced ventilation using a fan not shown in the drawing or a natural ventilation of the interior of the battery pack 20. The air flow passage X includes an intake passage Y that extends from the exterior of the battery pack 20 to the secondary chamber 148 via the first communication holes 149 and the second communication holes 150A and 150B, and further to the primary chamber 97 via the front openings 142F and the rear openings 142B, and an exhaust passage Z extending from the primary chamber 97 to the exterior of the battery pack 20 via the central openings 142M, the secondary chamber 148, the first communication holes 149, and the second communication holes 150A and 150B. Owing to the air that flows through the intake passage Y and the exhaust passage Z, the battery cells 98 are cooled. Thus, the first communication holes 149 and the second communication holes 150A and 150B function as a part of the cooling air flow passage X.

The effect of the battery pack 20 is described in the following. The battery pack 20 is mounted on the top surface of the electric lawn mower 1 in such a manner that the upper part is exposed, so that the battery pack 20 can be easily installed and removed, and the work efficiency is improved. Further, the battery pack 20 is provided with the air flow passage X that communicates the outside of the housing 100 with the secondary chamber 148, so heat is prevented from building up in the battery cells 98.

The battery pack 20 is placed on the upper surface of the electric lawn mower 1 such that the inner bottom plate 141 and the outer bottom plate 145 are on the lower side, and the reference surface 144 is horizontal under normal condition. Since the electric lawn mower 1 is mainly used outdoors, there is a possibility that rainwater or the like may intrude into the battery pack 20. When the battery pack 20 is mounted on the electric lawn mower 1, the first communication holes 149 and the second communication holes 150A and 150B of the battery pack 20 do not face upward, so that moisture is prevented from reaching the battery cells 98.

When the battery pack 20 is mounted on the electric lawn mower 1, the water flowing down along the wall surface of the battery pack 20 flows downward along the depending portion 149B, so that the water is prevented from entering the secondary chamber 148. This prevents the water from reaching the battery cells 98. Even when water should intrude from the first communication holes 149, since the upright wall 147 inclines outward and the second communication holes 150A and 150B are formed in the upright wall 147, the water is readily expelled from the first communication holes 149.

At this time, the water is particularly favorably expelled because the second communication holes 150A and 150B are passed vertically downward.

The battery pack 20 may be removed from the battery receiving recess 19 as required by holding the grip portion 104 and pulling the battery pack 20 out of the battery receiving recess 19. After removal, as illustrated in FIG. 6A, the battery pack 20 may be placed upside down so that the bottom surface faces vertically upward.

At such a time, as shown by the arrows in FIG. 6A, the second communication holes 150A and 150B open out upward, and are passed vertically through the upright wall 147. The water that may enter the second communication holes 150A and 150B from above is passed into the secondary chamber 148, and reaches the bottom surface of the inner bottom plate 141. When the bottom surface of battery pack 20 faces vertically upward, the bottom surface of inner bottom plate 141 is inclined downward toward the left and right outer edges thereof, so that water reaching the bottom surface of the inner bottom plate 141 flows towards the left and right outer edges of the inner bottom plate 141. Since the first communication holes 149 are provided at the left and right outer edges of the inner bottom plate 141, the water reaching the left and right outer edges is discharged to the outside through the first communication holes 149. Therefore, the water is prevented from reaching the battery cells 98.

In the present embodiment, the water that has passed through the second communication holes 150A and 150B is deposited on the part of the bottom surface of the inner bottom plate 141 corresponding to the area B. However, even if the water that has passed through the second communication holes 150A and 150B reaches the bottom surface of the inner bottom plate 141 corresponding to the area A, since the bottom surface of the inner bottom plate 141 corresponding to the area A is inclined downward toward the left and right outer edges, the water flows toward the left and right outer edges, and is expelled to the outside through the first communication holes 149.

The water that has reached the secondary chamber 148 from the second communication holes 150A and 150B is deposited on the bottom surface of the inner bottom plate 141 to form water globules having certain heights owing to the water repelling action of the bottom surface of the inner bottom plate 141. Since the height of the tubular flanges 143 from the reference surface 144 is greater than the heights of the water globules, the water that has reached the secondary chamber 148 to form water globule is prevented from entering the primary chamber 97.

After being removed, the battery pack 20 may be placed such that the left or right side surface faces vertically upward as illustrated in FIG. 6B.

When one of the side surfaces faces upward, the first communication holes 149 open out upward. The depending portion 149B extends downward along the side surface of the housing 100 at the upper edge 149A of the first communication hole 149. Therefore, the water droplets flowing downward along the side wall of the housing 100 is prevented from entering the secondary chamber 148. In particular, since the opening of the first communication hole 149 is narrowed, water droplets are prevented from entering the secondary chamber 148.

When the battery pack 20 is placed with one of the side surfaces facing vertically upward, the bottom surface of the inner bottom plate 141 is inclined toward the outer bottom plate 145 as one moves vertically downward. Therefore, the water is prevented from reaching the side surface of the tubular flange 143 through the first communication hole 149 along a vertically downward straight path.

As shown in FIG. 6B, owing to the presence of the inner ribs 152 in the hypothetical path extending otherwise linearly from the first communication holes 149 and the second communication holes 150A and 150B to the openings 142, the path from the first communication hole 149 and the second communication holes 150A and 150B to the openings 142 are highly tortuous (labyrinth-like). Therefore, the rainwater or the like from the first communication holes 149 and the second communication holes 150A and 150B is prevented from reaching the battery cells 98.

In FIG. 6B, the path of the water flowing vertically downward from the second communication holes 150A and 150B to the openings 142 is indicated by arrows. As shown in FIG. 6B, since the upright wall 147 is inclined with respect to the reference surface 144 of the inner bottom plate 141, the water which has flowed vertically downward into the second communication holes 150A and 150B collides with the side surfaces that define the second communication holes 150A and 150B. Therefore, the rainwater or the like from the second communication holes 150A, 150B is prevented from reaching the battery cells 98.

In addition, since the upright wall 147 is inclined outward, moisture is unlikely to stay between the upright wall 147 and the outer flat plate 146. Also, any moisture that may be trapped in the secondary chamber 148 can be readily drained by tilting the battery pack 20 in any direction.

The angle formed between the inner bottom plate 141 and the reference surface 144 is larger in the area B than in the area A. Thus, the angle formed between the inner bottom plate 141 and the reference surface 144 is greater in the area extending outward from the part of the inner bottom plate 141 opposing the second communication holes 150A, 150B and adjoining the upright wall 147 than in the area extending from the tubular flanges 143 to the part of the inner bottom plate 141 opposing the second communication holes 150A, 150B. The water that has entered the secondary chamber 148 from the second communication holes 150A and 150B does not move to the tubular flange 143 unless the reference surface 144 is inclined to the horizontal direction beyond the angle φ. Therefore, the water is prevented from reaching the battery cells 98.

The present invention has been described in terms of a specific embodiment, but the present invention is not limited by this particular embodiment, and can be modified in various ways without departing from the spirit of the present invention. For instance, the outer bottom plate 145 was attached to the inner bottom plate 141 by using screws in the present embodiment, but other means of attachment such as adhesive bonding and vibration welding may also be used.

In the above embodiment, the second communication holes 150A and 150B were provided in the upright wall 147, but may also be provided in the outer flat plate 146 as shown in FIG. 7. Even when the second communication holes 150C and 150D are provided in the outer flat plate 146, it suffices if the second communication holes 150C and 150D are formed so as to face the part of the bottom surface of the inner bottom plate 141 located between the upright wall 147 of the inner bottom plate 141 and the inner ribs 152. When the bottom surface of the battery pack 20 is disposed vertically upward, the water that has flowed into the secondary chamber 148 through the second communication holes 150C and 150D reaches the surface part of the inner bottom plate 141 located between the upright wall 147 and the tubular flanges 143. The water that has reached the surface part of the inner bottom plate 141 located between the upright wall 147 and the tubular flange 143 flows downward along the surface of the inner bottom plate 141, and is discharged from the first communication holes 149, so that the water is prevented from reaching the battery cells 98. When the bottom surface of battery pack 20 faces vertically downward, the water that may be collected in the part of the secondary chamber 148 located between upright wall 147 and inner ribs 152 is discharged from the second communication holes 150C and 150D.

Glossary of Terms

| | |
|---|---|
| 1: electric lawn mower | 20: battery pack |
| 97: primary chamber | 98: battery cell |
| 100: housing | 141: inner bottom plate |
| 142: opening | 143: tubular flange |
| 144: reference surface | 145: outer bottom plate |
| 146: outer flat plate | 147: upright wall |
| 148: secondary chamber | 149: first communication hole |
| 150A: second communication hole | 150B: second communication hole |
| 150C: second communication hole | 150D: second communication hole |
| 152: inner rib | X: air flow passage |

The invention claimed is:

1. A battery pack, comprising:
a housing having an outer bottom plate and an inner bottom plate, and defining a primary chamber for accommodating battery cells above the inner bottom plate, and a secondary chamber between the outer bottom plate and the inner bottom plate;
wherein the outer bottom plate includes an outer flat plate extending substantially in parallel to the inner bottom plate characterized in that the outer bottom plate further includes an upright wall extending from a peripheral part of the outer flat plate to abut against a peripheral part of the inner bottom plate, the inner bottom plate being provided with at least one opening surrounded by a tubular flange projecting toward the outer bottom plate, the housing including an air communication passage formed in the upright wall of the outer bottom plate and communicating the secondary chamber with an exterior of the housing; and wherein a bottom surface of the inner bottom plate includes a substantially horizontal reference surface, and a part of the bottom surface of the inner bottom plate adjacent to the upright wall inclines upwards with respect to a horizontal reference surface along a direction away from the outer bottom plate and towards the upright wall, and wherein the air communication passage includes a first communication hole having an edge located above the reference surface of the inner bottom plate.

2. The battery pack according to claim 1, wherein the upright wall inclines outward from the peripheral part of the outer flat plate toward the peripheral part of the inner bottom plate.

3. The battery pack according to claim 1, wherein the air communication passage includes a second communication hole formed in the upright wall.

4. The battery pack according to claim 3, wherein the second communication hole is passed through substantially orthogonally to the reference surface.

5. The battery pack according to claim 4, wherein a part of the bottom surface of the inner bottom plate extending outward at least from a position opposing the second communication hole inclines upward.

6. The battery pack according to claim 5, wherein a part of the inner bottom plate extending outward of the tubular flange inclines away from the outer bottom plate and the upright wall, and an angle formed between the reference surface and a part of the bottom surface of the inner bottom plate extending outward from the position opposing the second communication hole is greater than an angle formed between the reference surface and a part of the bottom surface of the inner bottom plate extending from the tubular flange to the position opposing the second communication hole.

7. The battery pack according to claim 1, wherein the outer flat plate is provided with a rib extending in a part of the outer flat plate located between a part of the outer flat plate opposing the tubular flange and the upright wall, and projecting toward the inner bottom plate.

8. The battery pack according to claim 1, wherein the outer flat plate is provided with a rib extending between a part of the outer flat plate opposing the tubular flange and the upright wall and projecting toward the inner bottom plate, and a second communication hole formed in a part thereof located between the upright wall and the rib.

9. The battery pack according to claim 1, wherein the battery pack is configured to be mounted on a main body of an electric power equipment with at least an upper part of the battery pack exposed to an exterior.

10. The battery pack according to claim 9, wherein the battery pack is configured to be mounted on the main body of the electric power equipment with the reference surface extending substantially horizontally, and an upper edge of the first communication hole is formed with a depending portion projecting downward along a side surface of the housing.

* * * * *